Figure 1:
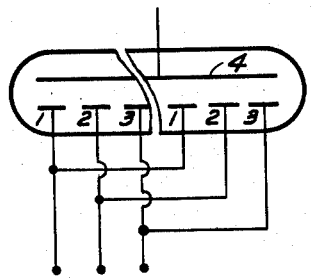

May 20, 1958   J. C. GUNDLACH ET AL   2,835,848
MULTI-ELECTRODE TUBE PULSE MEMORY CIRCUIT
Filed Feb. 15, 1954   2 Sheets-Sheet 1

INVENTORS
Joseph C. Gundlach
BY James B. Reeves

ATTORNEY

May 20, 1958     J. C. GUNDLACH ET AL     2,835,848
MULTI-ELECTRODE TUBE PULSE MEMORY CIRCUIT
Filed Feb. 15, 1954     2 Sheets-Sheet 2
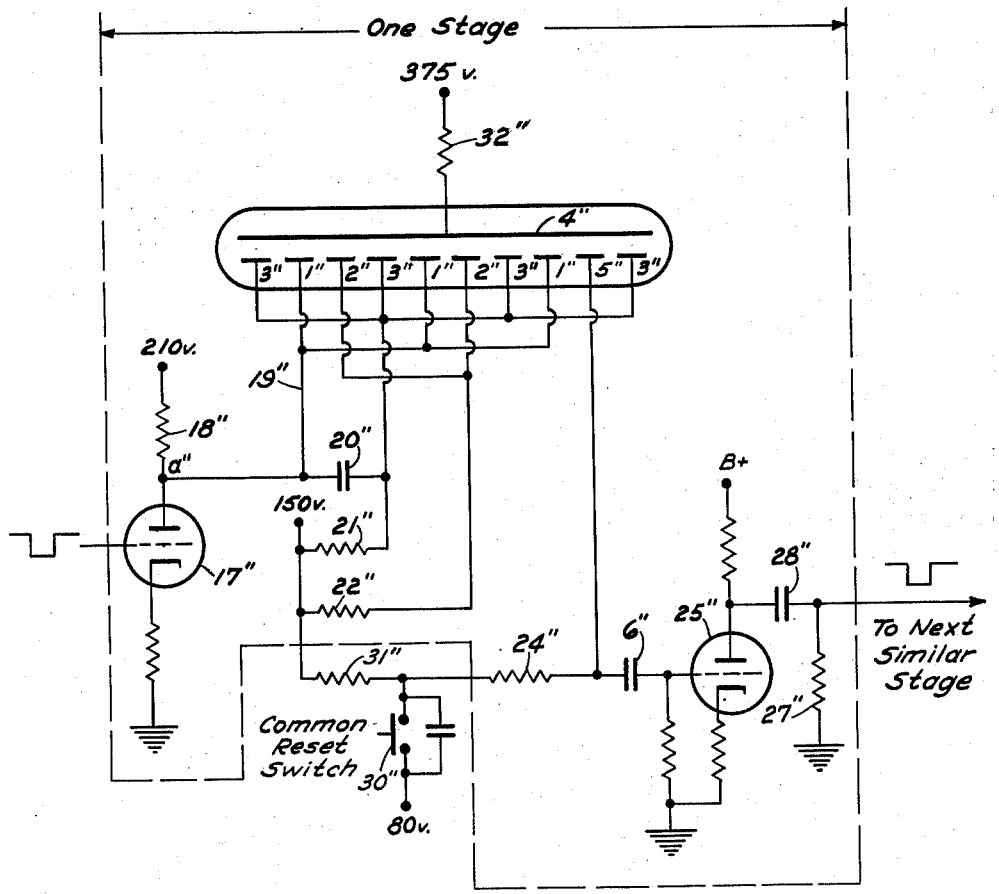
*Fig-4-*
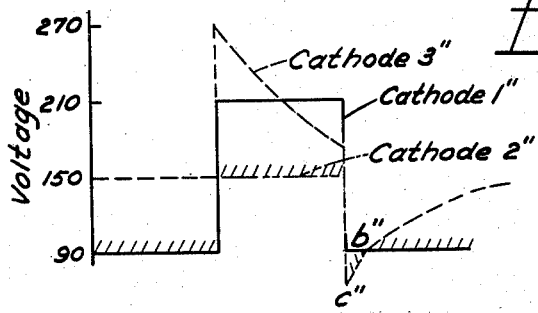
*Fig-5-*
INVENTORS
Joseph C. Gundlach
BY James B. Reeves
Roland A. Anderson
ATTORNEY

2,835,848

MULTI-ELECTRODE TUBE PULSE MEMORY CIRCUIT

Joseph C. Gundlach, Loudon County, Tenn., and James B. Reeves, Milwaukee, Wis., assignors to the United States of America as represented by the United States Atomic Energy Commission Application February 15, 1954, Serial No. 410,465

5 Claims. (Cl. 315—84.6)

This invention relates to control circuits for pulse memory devices for scalers, computers, calculators and the like, and more particularly to a driving or energizing circuit for a polycathode electron tube used as a counting or storage tube or as an integrating device.

In the prior art it was generally the practice to use scalers of the binary or ring types to drive a measuring circuit for counting or recording pulses at a high rate of speed. The conventional scalers generally took the form of a scale of 64 and usually consisted of a number of scaling stages. Each stage comprised a trigger or flip-flop circuit with diodes associated therewith at each stage to insure proper operation. A mechanical register was usually coupled to the output of the scaler to take the scaled down count. One form of such scaler designed for the decimal system scale of ten included four double triodes connected to form four trigger circuits, and four double diodes for association with these four trigger stages. In addition, such supplemental coupling elements as resistors and capacitors were necessary, thereby increasing the initial cost and the power requirements of the system. Such a system, when cascaded with other like sysems to increase the counting range, occupied a substantial space and introduced stabilizing problems in maintaining critical biasing for the trigger stages and other circuits associated therewith, and the noise resulting from the operation of the mechanical recorders created problems, particularly where such equipment was to be used in hospitals and laboratories.

Efforts have been made to overcome these problems by a reduction of components and by minimizing the critical voltage relationships that must be maintained. One such arrangement, known to the prior art, involved the use of a poly-anode tube where a common cathode was at least partially surrounded by a series of spaced anodes. The device was intended to function as a memory device to count and store pulses. This was to be carried out by connecting the spaced anodes electrically in such a manner as to form a path of sequentially alternate anodes in respect to the common cathode. The circuit for energizing and controlling the poly-anode discharge device, in such a manner that the device could carry out the function of the conventional decade scaler of either the Eccles-Jordan or the thyratron ring type, contemplated the use of a driving circuit which employed a series of voltage divider networks connected, respectively, to the various sets of anodes and to the common cathode of the discharge device. The various voltage divider networks were bridged across a common voltage source and acted as separate bleeder paths. Certain portions of selected voltage divider networks were shunted with capacitors to permit the ready passage of transients which were employed to effect the required sequence of operations. In addition, association of a series of these devices in cascade would greatly reduce the bulk and power requirements of a scaler system, and would serve to eliminate a substantial number of electric discharge devices and coupling elements.

Although this served to meet the problem of maintaining critical voltage biasing relations as between different trigger circuits and channels, it introduced other problems which required solution if it were to be suitable for use with other like devices in a counter or computer. These problems arose primarily as a result of the particular driving or energizing circuit employed to operate the poly-anode tube. The use of a series of voltage divider networks and associated capacitors for controlling the operation of the poly-anode tube set up critical voltage relationships and circuit time constants which increased the response time of the arrangement, and limited the range and pulse shapes which might be accepted and operated upon by a system of this character. The type of circuit networks also served as a further limitation on the counting rate and tended to contribute to the increase of the response time of the system. Then, to secure proper operation, component values became critical and supply voltages required stabilization in order to prevent false or unreliable operation.

Applicants with a knowledge of these problems of the prior art have for an object of their invention the provision of a driving circuit for a scaler or counter which reduces the response time of the system.

Applicants have as another object of their invention the provision of a driving circuit for a poly-cathode tube which permits it to be associated with other like tubes into a scaling or memory circuit in such a manner as to greatly reduce the number of circuit components together with the weight and bulk of the apparatus.

Applicants have as another object of their invention the provision of a counting and scaling system wherein the duration and shape of the pulse which may be accepted by it is not critical.

Applicants have as another object of their invention the provision of a more stable driver circuit for a poly-cathode discharge device which eliminates or reduces the number of circuit components and associates the components used in such a manner that the component values are less critical.

Applicants have as a further object of their invention the provision of an arrangement of poly-cathode discharge devices into a combination scaler and recorder or memory circuit which eliminates the noise incident to mechanical recorder operation and better adapts the system for use in hospitals, laboratories and the like.

Other objects and advantages of our invention will appear in the following specification and accompanying drawings, and the novel features thereof will be particularly pointed out in the annexed claims.

Figure 2:
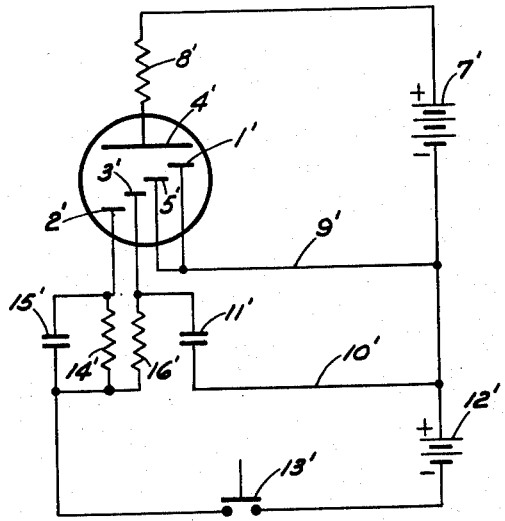
Figure 3:
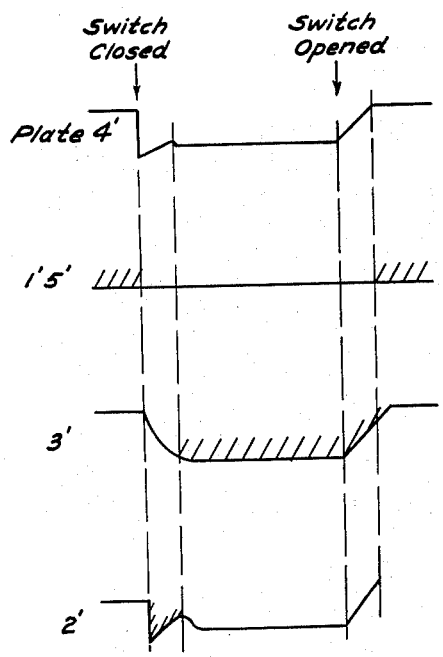

Fig. 1 is a schematic of a portion of a poly-cathode type of electric discharge device. Fig. 2 is a schematic of a simplified form of our improved circuit employed to drive a poly-cathode type electric discharge device. Fig. 3 is a set of voltage wave forms plotted against time for the various sets of electrodes indicating the respective periods of discharge through them. Fig. 4 is a schematic of another form of our improved driving circuit for a poly-cathode electric discharge device. Fig. 5 is a chart or diagram showing the general shape of the waves representing the potentials on certain cathodes of the poly-cathode tube of Fig. 4.

Referring to the drawings in detail, a portion of the poly-cathode discharge tube is schematically shown in Fig. 1. This is a conventional type of tube. See Wales 2,443,407 and 2,524,213. It includes a central anode structure with a plurality of groups of spaced cathodes arranged to form a continuous ring or enclosure about the central anode. Each group usually comprises three adjacently positioned cathodes 1, 2 and 3. Corresponding cathodes in each group, that is cathodes 1, and 2, and 3 are associated into separate common circuits to form a path of sequentially alternate cathodes with respect to a common anode 4 located adjacent to this path. This is accomplished by connecting each of the electrodes 1, 1, etc. and 2, 2 etc. and 3, 3 etc. together electrically to form three common circuits. All of the above electrodes are supported within a suitable, preferably low pressure, gaseous discharge atmosphere. Thus, in this discharge tube, when a potential in excess of the breakdown voltage is applied to any one of these cathodes relative to the common anode, a visible discharge will take place at one only of the plurality of discharge points or cathodes because of the fact that as soon as one discharge is established at a discharge point or cathode, its discharge current passing through the circuits coupled to the tube, causes a drop such that this lower potential is inadequate to initiate a second discharge at any other point or cathode of this tube. It is this mutually exclusive discharge feature which is the basis of the mnemonic integrating characteristics of the device. The present arrangement provides for the transfer of discharge from one discharge point of the master cathode to the next discharge point by causing an input pulse which is to be counted or integrated, first to deenergize one of the master cathodes, and then to energize sequentially the other two intervening discharge cathodes before energizing another of the master cathodes, thereby physically transferring the discharge through a definite directed displacement. The reason why the discharge will transfer only to the adjacent discharge point instead of to some arbitrarily remote point or cathode of the tube, is that the presence of ions in the region surrounding the discharge and persisting even after the exciting voltage for the discharge has been removed, sets up preferential conditions for the re-establishment of the discharge in the neighborhood of the region in which the discharge has just terminated. Thus, if only two multiple alternate cathodes or only two sets of alternate cathodes were used there would be an ambiguity as to which of the adjacent points or cathodes would capture the terminating discharge, whereas with three sets of sequentially alternate cathodes there will be a positive directed preference for the discharge to move along the electrode path determined by the order of excitation of the cathodes adjacent to the one which is accepting the discharge. Further, the path of the alternate discharge points or cathodes may be closed so as to comprise a cyclic or self-resetting counter, or the path may be linear or non-cyclic with special means provided for resetting.

The sequential transfer of excitation between three sets of electrodes may be made by our improved electronic driving circuit. In this arrangement transfer of the discharge from one electrode to the next is accomplished by decreasing the potential between the electrodes where the discharge is taking place or by increasing the potential between the selected next adjacent electrode and the common electrode. This causes the discharge to move progressively along the electrodes each time a pulse is received. Each pulse usually accounts for the transfer of the discharge sequentially over a group of three electrodes. At some appropriate point in the system, which is employed to mark the end of the sequence of travel of the discharge in the tube, or is intended to mark the completion of a cycle, a special or transfer electrode is employed which when the discharge is set up between it and the common electrode, transfers a signal to a coupling tube for application to the next poly-cathode tube of the cascade.

In the simplified arrangement of a poly-cathode tube and driving circuit of Fig. 2, only one group of adjacent cathodes is shown therein, together with a single master electrode. While this schematic is not intended to show the actual physical relationships between the cathode electrodes, it may be noted that cathode electrode 1' will be located physically adjacent to cathode electrode 2', since the cathodes are positioned in a circle or other closed loop. It will be understood, however, that any desired number of these groups may be associated together in such a tube to accomplish the necessary storing action. The more groups of adjacent electrodes that are included, the more pulses may be counted and stored in the tube itself before being passed on to the next following stage. In this simplified arrangement, the electrodes 1', 2' and 3' indicate a series of adjacent electrodes, while 5' designates a special electrode. For convenience electrodes 1' and 5' are connected together. The central common anode is indicated at 4'. The driving circuit comprises a source 7' of electromotive force having its positive terminal coupled through a resistor 8' to the anode 4'. The negative side of the source 7' is coupled through line 9' to the cathode electrodes 1', 5'. It is also coupled through line 10' and coupling condenser 11' to electrode 3'. It is further coupled to a supplemental source of E. M. F. 12'. This supplemental source of E. M. F. 12' has its negative terminal coupled through switch 13' and resistor-capacitor network 14', 15' to the cathode 2'. The source 12' is also coupled through switch 13' and a resistor 16' to the cathode electrode 3'. While applicants have, for convenience, merely shown a manually operated push-button type of switch 13' for completing the circuit between supplemental E. M. F. source 12' and cathodes 2' and 3', it will be understood, that any other appropriate type of switch, such as pulse operated vacuum tube might be inserted in the circuit to replace the switch 13' and control the operation.

In its operation, and with switch 13' in the normally open position, discharge occurs between the cathode 1' and the anode 4'. However, upon the closing of the switch 13', a negative pulse is transferred through the capacitor 15' to the cathode 2'. Since the cathode 2' is located adjacent to cathode 1', and since the negative pulse applied to the cathode 2' lowers its potential to a point substantially below that of cathode 1' and cathode 3' the discharge will transfer from cathode 1' to cathode 2'. Now, the discharge between anode 4' and cathode 2' gradually charges up the condenser 15', and the drop across the resistor 14' by reason of current flow will raise the potential of cathode 2' to the point where it is above the reference potential now present and applied through the switch 13' and resistor 16' from the supplemental source of E. M. F. 12' to the cathode 3'. The potential of cathode 3' has reached the reference potential after a short delay from the R-C circuit 16' and 11'. When this occurs, the discharge will then transfer from cathode 2' to cathode 3'. Now after switch 13' is opened, this discharge between anode 4' and cathode 3' will continue until the condenser 11' has been charged up. When this occurs the potential of cathode 3' rises to the point where the discharge is now transferred back to the cathode 1' from the cathode 3'. This is the sequence of operations which is followed in the tube as a result of the action of the driving circuit. Since this circuit only involves a relatively small number of components, and since the voltage relationships are not critical, it is possible to realize good stabilization.

Fig. 3 shows a graph of wave forms which will indicate the various potentials on the different cathodes with respect to time. It will be seen that the potential on the cathodes 1 and 5 remains constant and the hatching indicated on the graph represents the period during which discharge takes place between the anode and cathodes 1', 5'. Within a short time after the switch is closed, it will be seen that discharge takes place across cathode 2' until by the charging of condenser 15', its potential is approximately that of cathode 3'. Thereafter, the relatively high resistance 14' will not support a substantial discharge and it will be seen by the hatching that the discharge transfers to cathode 3' and continues through this cathode until after the switch is opened and condenser 11' has been charged.

Fig. 4 shows a portion of a poly-cathode discharge tube, which may take the form of a "Remtron" poly-cathode glow tube, with another form of our improved driving circuit. In this arrangement the anode is designated 4" and the adjacent groups of cathodes each have cathodes designated, respectively, 1", 2", and 3". The anode is coupled through a resistor 32", of preferably 82K, to a source of potential of about 375 volts, and like or corresponding cathodes are electrically coupled together as previously described. An electronic discharge device in the form of triode 17" is employed to trigger the driving circuit. The plate of this tube is connected through a load resistor 18", preferably of a value of 47K, to a B+ potential, which may be of the order of 210 volts. The plate is also coupled through line 19" to the common circuit linking or coupling the various number 1" cathodes of the tube. It is also coupled through coupling condenser 20", which is preferably of the order of .001 mf., to the common circuit linking, or coupling, the various number 3" cathodes of the poly-cathode tube. The number 3" cathodes are also preferably coupled through a 56K resistor 21" to a 150 volt source of E. M. F. The number 2" cathodes are coupled through a resistor 22", which may be negligible in value, to the same 150 volt reference potential. The special or transfer electrode, 5", referred to above, is coupled through resistor 24", which may be of magnitude 3.3K to the 150 volt reference potential and to a normally open switch 30" which connects to a lower potential, such as 80 volts, and causes the initiation of glow at that cathode when reset action is desired. The special cathode 5" is likewise coupled through a coupling condenser 6" to a transfer tube 25" which serves to transfer the final signal to the input or control tube of the following poly-cathode discharge tube stage. This input tube may be similar to tube 17", and the time constants of its circuit should be appreciably greater than that of R-C circuit 20", 21".

In its operation, the control tube 17" is normally biased so that it is operating when there is no signal on its control grid. The operation of this tube creates a drop through load resistor 18" and lowers the potential at point a" to a level below the 150 volt reference potential applied to cathodes 2" and 3" so that the potential normally applied to the number 1" cathode of the poly-cathode discharge device is lower than that normally applied to cathodes 2" and 3". This causes the discharge to occur between the anode 4" and the cathode 1". However, when a negative pulse is applied to the control grid of the control tube 17", conduction through that tube is cut off so that a positive pulse appears at point a" and this is transferred to the cathode 1" through the lead 19", raising its potential to a point where discharge is transferred to an adjacent cathode of lower potential. At the same time this positive pulse is coupled through condenser 20" and is applied to raising the potential of cathode 3". This prevents the discharge from transferring from cathode 1" to cathode 3". However, since the reference potential applied to cathode 2" is lower than that applied to cathode 1", the discharge is transferred from cathode 1" to cathode 2".

When the transient pulse, coupled through the capacitor 20" to the cathode 3", decays to a point where its potential is less than the potential on cathode 1", the input pulse to the tube 17" has served its purpose. Then after input pulse is completed or removed from the control grid of tube 17", the discharge in the poly-cathode tube will transfer from electrode 2" to electrode 3", because electrode 3" is at the lowest potential of the group, as indicated at c" in Fig. 5. This occurs as the result of the action of removing the pulse from the input of tube 17" which lowers the plate voltage of the tube and this voltage change is coupled through condenser 20" to cathode 3", causing its potential to drop below that of cathode 2". The gaseous discharge current between anode 4" and cathode 3" and the circuit including resistor 21" discharges condenser 20" until a point b", as indicated in Fig. 5, is reached, where the potential is approximately equal to the potential on cathode 1". At this time the glow discharge is transferred from cathode 3" to cathode 1". The condenser 20" continues to discharge through the resistor 21" until it approaches the normal state. The circuit can then accept the next pulse and the cycle is repeated.

This sequence is followed each time a negative pulse is applied to the control tube 17" so that the discharge progresses around the tube from cathode to cathode until the separate cathode 5" is reached. When the discharge is set up on cathode 5", it is transferred in the form of a pulse to the control grid of the transfer tube 25" and coupled through conventional resistance 27" and capacitance 28" coupling to the control tube 26" of the next succeeding poly-cathode discharge tube.

From the foregoing, it will be apparent that Fig. 5 is a graph showing the general nature of the potential on the electrodes 1" and 3". The full line wave indicates the potential on cathode 1" as the result of the action of a pulse. The dotted line wave is intended to represent the potential which results at cathode 3" by reason of the differentiation of the pulse passing through the condenser 20".

From the foregoing it is apparent, that one form of the above poly-cathode discharge device is constructed with an arcuate sequence of cathodes, each sequence consisting of a 1", 2", and 3" cathode. The one exception to this is that one group has the 2" cathode replaced by a special cathode 5". This cathode is coupled into the input of the transfer circuit through the coupling condenser 6" and is transferred to the next succeeding control tube for a poly-cathode discharge device.

It will also be apparent from the above description, that these poly-cathode discharge devices may be cascaded through coupling tubes to form a system which may be employed as a scaler over a very wide range of pulses or counts. By using a single poly-cathode discharge device to replace an entire binary type of scaler with its many electric discharge devices, it will be seen that a saving in energy requirements, space, and weight may be realized. At the same time, it is possible to read the count directly from the poly-cathode tube without the use of a mechanical recorder which would create noise and disturbance in places where this is not desired.

The values of elements 20" and 21" are chosen such that the resultant time constant is appreciably longer than the ion collection time in the poly-cathode discharge tube. The width of the input pulse is chosen to be of the same order of time as the time constant of capacitor 20" and resistor 21". Thus, cathode 2" will conduct the discharge for a time sufficient to appreciably collect the ions formed during the conduction on cathode 1" (if all the ions were not collected, there would be a tendency for the discharge to return to the original cathode 1" instead of cathode 3" followed by the sequential cathode 1"). If the time constant of R-C circuit 20" and 21" is appreciably shorter than the collection time and the pulse is longer, the immediate stage under consideration may operate satisfactorily, but the pulses to the next similar stage will be shortened to the extent that it may not permit proper operation of that stage.

If the time constant of R-C circuit 20" and 21" is suitable, but the input pulse is overly long, some conduction will take place on cathode 3" (depending on the relative value of resistor 21" to resistor 24") after a time equivalent to one or more time constants of R-C circuit 20", 21", and the shape of the pulse feeding to the next stage will be changed. In particular, its duration in time will be shortened with respect to the original input pulse. This is not detrimental to the operation of the circuit or succeeding stages.

Having thus described our invention, we claim:

1. A system for storing and indicating the number of pulses stored comprising a poly-cathode tube of the gaseous discharge type having an anode and a continuous series of separate groups of at least three cathodes, a transfer electrode interposed between two of said groups of cathodes for transferring signals, means for coupling the corresponding cathodes of each of said groups of cathodes together to provide separate circuits, means for applying potentials to each of the separate circuits, means for normally maintaining one of said separate circuits at a lower potential than the others to sustain a discharge between a cathode thereof and the anode, and an eletcric discharge device coupled through low time constant means to the separate circuits and responsive to signals to be counted to progressively alter the potentials thereof to cause the discharge to move sequentially across the cathodes of a group of said cathodes in response to each of said signals.

2. A system for storing and indicating the number of pulses stored comprising a poly-cathode tube of the gaseous discharge type having an anode and a continuous series of separate groups of at least three cathodes, a transfer electrode interposed between two of said groups of cathodes for transferring signals, means for coupling the corresponding cathodes of each of said groups of cathodes together to provide a plurality of common circuits, means for applying potentials to each of the common circuits, means for normally maintaining one of said common circuits at a lower potential than the others to normally sustain a discharge between a cathode thereof and the anode, and an electric discharge device coupled to at least two of the common circuits and responsive to signals to be counted for applying signals to said common circuits to simultaneously raise the potentials of their cathodes and cause the discharge to move sequentially across all of the cathodes of a group in response to each of said signals.

3. A system for storing and indicating the number of pulses stored comprising a poly-cathode tube of the gaseous discharge type having an anode and a continous series of separate groups of at least three cathodes, a transfer electrode interposed between two of said groups of cathodes for transferring signals, means for connecting the corresponding cathodes of each of said groups of cathodes together to provide a plurality of common circuits, means for applying potentials to each of said common circuits, the potential applied to one of said common circuits being lower than that applied to the others for normally sustaining a discharge between a cathode thereof and the anode, an electric discharge device having its output coupled to the last named common circuit and another of said common circuits, and means for applying a pulse to be counted to the input of the discharge device for decreasing its conduction and causing the discharge to move sequentially across the cathodes of one of said groups.

4. A system for storing and indicating the number of pulses stored comprising a poly-cathode tube of the gaseous discharge type having an anode and a continuous series of separate groups of at least three cathodes, a transfer electrode interposed between two of said groups of cathodes for transferring signals, means for coupling the corresponding cathodes of each of said groups of cathodes together to provide a plurality of common circuits, means for applying potentials to each of the common circuits, a normally conducting electric discharge device having its output coupled to one of said common circuits for maintaining its potential lower than the others to normally sustain a discharge between a cathode thereof and the anode, means for coupling said discharge device to at least one of the other of said common circuits, and means for applying a signal to be counted to said discharge device for decreasing its conduction to raise the potential of the circuits to which it is coupled and cause the discharge to pass sequentially across the cathodes of one of said groups in response to the signal.

5. A system for storing and indicating the number of signals stored comprising a poly-cathode tube of the gaseous discharge type having an anode and a continuous series of separate groups of cathodes, a transfer electrode interposed between two of said groups of cathodes for transferring signals, means for coupling the corresponding cathodes of each of said groups of cathodes together to provide a plurality of common circuits, means for applying a potential to each of the common circuits, a normally conducting electric discharge device coupled directly to one of said common circuits for maintaining its potential lower than the others to normally sustain a discharge between a cathode thereof and the anode, means for capacitatively coupling the output of the discharge device to another of said common circuits for instantaneously applying changes in the output potential of the discharge device thereto, and means for applying negative signals to be counted to the input of the discharge device for reducing its conduction to raise the potential of the common circuits to which it is coupled and cause the discharge to travel sequentially along the cathodes of one of said groups in response to each of said signals.

References Cited in the file of this patent
UNITED STATES PATENTS

| | | |
|---|---|---|
| 2,524,213 | Wales | Oct. 3, 1950 |
| 2,675,504 | Wales | Apr. 13, 1954 |
| 2,679,978 | Kandiah | June 1, 1954 |